US007017176B1

(12) United States Patent
Lee et al.

(10) Patent No.: US 7,017,176 B1
(45) Date of Patent: Mar. 21, 2006

(54) DATA TRANSMISSION OVER MULTIPLE UPSTREAM CHANNELS WITHIN A CABLE MODEM SYSTEM

(75) Inventors: Glenn E. Lee, Fremont, CA (US); Patrick S. King, Stow, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/330,225

(22) Filed: Jun. 10, 1999

(51) Int. Cl.
*H04N 7/173* (2006.01)
(52) U.S. Cl. ..................... 725/111; 725/126
(58) Field of Classification Search ............... 725/111, 725/121, 122, 126, 125; 370/536; 375/260
See application file for complete search history.

(56) References Cited

U.S. PATENT DOCUMENTS

| 5,278,889 | A | * | 1/1994 | Papanicolaou et al. ... | 348/14.01 |
| 5,745,836 | A | * | 4/1998 | Williams ................ | 725/125 |
| 5,881,361 | A | * | 3/1999 | Mannette ................ | 455/3.3 |
| 5,949,788 | A | * | 9/1999 | Friedman ................ | 370/431 |
| 5,963,557 | A | * | 10/1999 | Eng ........................ | 370/432 |
| 6,185,224 | B1 | * | 2/2001 | Limb et al. ............... | 370/459 |
| 6,230,326 | B1 | * | 5/2001 | Unger ....................... | 725/111 |
| 6,351,469 | B1 | * | 2/2002 | Otani ........................ | 370/459 |

OTHER PUBLICATIONS

Radio Frequency Interface Specification, SP-RFI-102-971008, DOCSIS, Interim Specification, Cable Television Laboratories, Inc., 1997.*

* cited by examiner

*Primary Examiner*—Vivek Srivastava
(74) *Attorney, Agent, or Firm*—Beyer Weaver & Thomas, LLP (57) ABSTRACT

A system and method are disclosed for transmitting upstream data from a cable modem within a cable television plant. One aspect of the invention pertains to a method that includes transmitting a first portion of the upstream data on a first upstream channel from the cable modem and transmitting a second portion of the upstream data on a second upstream channel from the cable modem. The second upstream channel differs from the first upstream channel. In another aspect, the invention pertains to a cable modem that includes a processor configured to initiate transmission on multiple upstream channels. The cable modem further includes an upstream transmitting component operating in conjunction with the processor and configurable by the processor to transmit data over multiple upstream channels. In one embodiment, the upstream transmitting component includes a first transmitter that is capable of being configured by the processor to transmit data at both a first upstream channel and a second transmitter that is capable of being configured by the processor to transmit at a second upstream channel that differs from the first upstream channel.

62 Claims, 7 Drawing Sheets

DATA TRANSMISSION OVER MULTIPLE UPSTREAM CHANNELS WITHIN A CABLE MODEM SYSTEM

BACKGROUND OF THE INVENTION

1. Field of the Invention

The present invention relates to transmitting data over existing cable television plants using cable modems. More specifically, it relates to upstream transmission of data from the cable modem to the head end.

2. Description of the Related Art

The cable TV industry has been upgrading its signal distribution and transmission infrastructure since the late 1980s. In many cable television markets, the infrastructure and topology of cable systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable head end, i.e. a distribution hub, which received analog signals for broadcast from various sources such as satellites, broadcast transmissions, or local TV studios. Coaxial cable from the head end was connected to multiple distribution nodes, each of which could supply many houses or subscribers. From the distribution nodes, trunk lines (linear sections of coaxial cable) extended toward remote sites on the cable network. A typical trunk line is about 10 kilometers. Branching off of these trunk lines were distribution or feeder cables (40% of the system's cable footage) to specific neighborhoods, and drop cables (45% of the system's cable footage) to homes receiving cable television. Amplifiers were provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the head end of a particular cable system is broadcast to all subscribers on that cable system. The subscriber simply needed a television with an appropriate cable receptor to receive the cable television signal. The cable TV signal was broadcast at a radio frequency range of about 60 to 700 MHz. Broadcast signals were sent downstream; that is, from the head end of the cable system across the distribution nodes, over the trunk line, to feeder lines that led to the subscribers. However, the cable system did not have the equipment necessary for sending signals from subscribers to the head end, known as return or upstream signal transmission. Not surprisingly, nor were there provisions for digital signal transmission either downstream or upstream.

Figure 1:
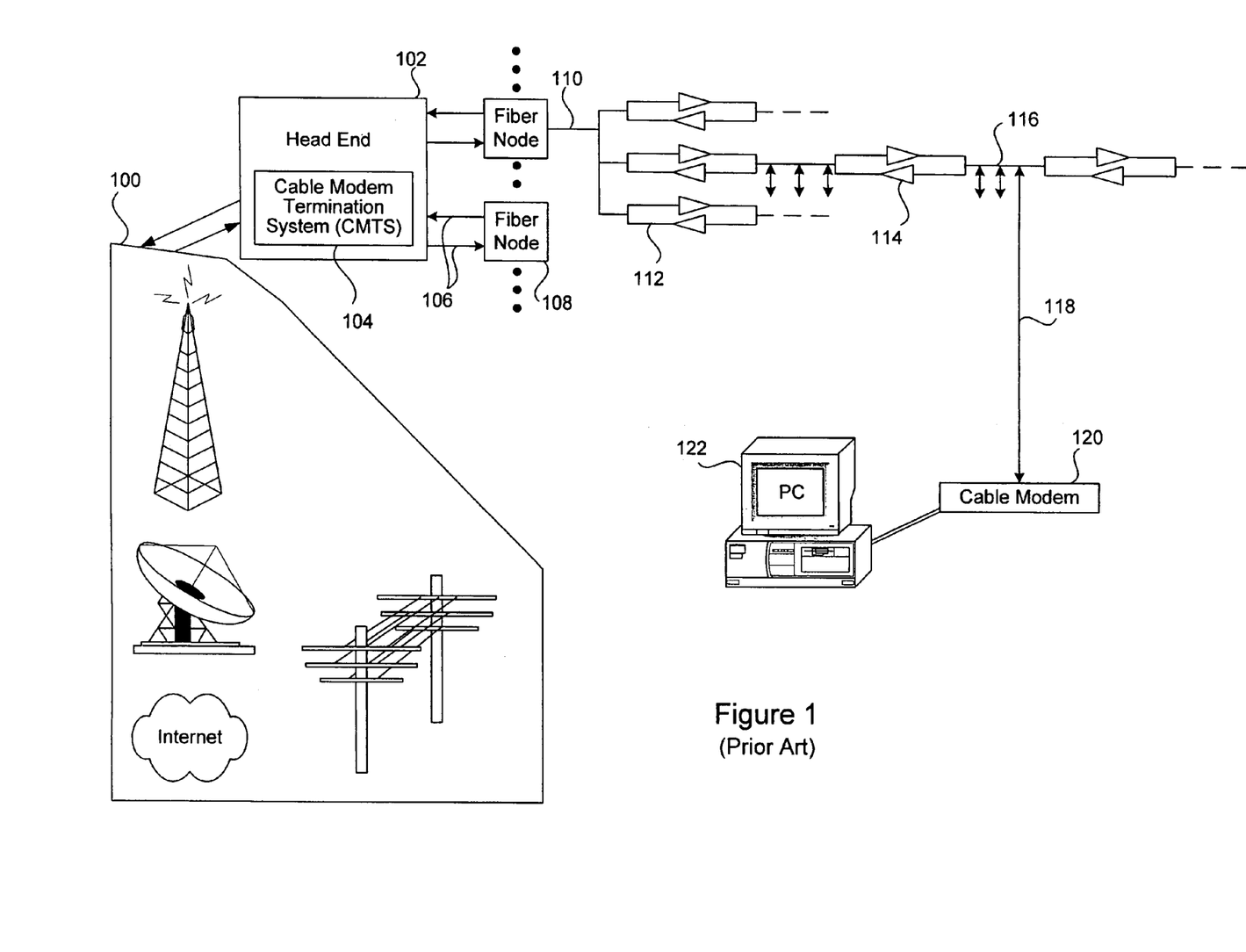
FIG. 1 is a block diagram of a two-way hybrid fiber-coaxial (HFC) cable system utilizing a cable modem for data transmission.

In the 1980s, cable companies began installing optical fibers between the head end of the cable system and distribution nodes (discussed in greater detail with respect to FIG. 1). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be up to 80 kilometers, whereas a typical coaxial trunk line is about 10 kilometers, as mentioned above. Prior to the 1990s, cable television systems were not intended to be general-purpose communications mechanisms. Their primary purpose was transmitting a variety of entertainment television signals to subscribers. Thus, they needed to be one-way transmission paths from a central location, known as the head end, to each subscriber's home, delivering essentially the same signals to each subscriber. HFC systems run fiber deep into the cable TV network offering subscribers more neighborhood specific programming by segmenting an existing system into individual serving areas between 500 to 2,000 subscribers. Although networks using exclusively fiber optics would be optimal, presently cable networks equipped with HFC configurations are capable of delivering a variety of high bandwidth, interactive services to homes for significantly lower costs than networks using only fiber optic cables.

FIG. 1 is a block diagram of a two-way hybrid fiber-coaxial (HFC) cable system utilizing a cable modem for data transmission. It shows a head end 102 (essentially a distribution hub) which can typically service about 40,000 subscribers. Head end 102 contains a cable modem termination system (CMTS) 104 connected to a fiber node 108 by pairs of optical fibers 106. The primary functions of the CMTS are (1) receiving signals from external sources 100 and converting the format of those signals, e.g., microwave signals to electrical signals suitable for transmission over the cable system; (2) providing appropriate Media Access Control (MAC) level packet headers (as specified by the MCNS standard discussed below) for data received by the cable system, (3) modulating and demodulating the data to and from the cable system, and (4) converting the electrical signal in the CMTS to an optical signal for transmission over the optical lines to the fiber nodes.

Head end 102 is connected through pairs of fiber optic lines 106 (one line for each direction) to a series of fiber nodes 108. Each head end can support normally up to 80 fiber nodes 108. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112 which permit certain frequencies to go in one direction and other frequencies to go in the opposite direction. Each fiber node 108 can normally service up to 500 subscribers. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data. The data may be Internet data, digital audio, or digital video data, in MPEG format, for example, from one or more external sources 100. Using two-way HFC cable systems for transmitting digital data are attractive for a number of reasons. Most notably, they provide up to a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data are typically transmitted at speeds ranging from 2,400 to 33,600 bits per second (bps) using commercial (and widely used) data modems for personal computers. Using a two-way HFC system as shown in FIG. 1 with cable modems, data may be transferred at speeds up to 10 million bps. Table 1 is a comparison of transmission times for transmitting a 500 kilobyte image over the Internet.

TABLE 1

| Time to Transmit a Single 500 kbyte Image | |
| --- | --- |
| Telephone Modem (28.8 kbps) | 6–8 minutes |
| ISDN Line (64 kbps) | 1–1.5 minutes |
| Cable Modem (10 Mbps) | 1 second |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect head ends to fiber nodes and, in some instances, to also use them in the trunk lines of the coaxial distribution system. In way of background, optical fiber is constructed from thin strands of glass that carry signals longer distances and faster than either coaxial cable or the twisted pair copper wire used by telephone companies. Fiber optic lines allow signals to be carried much greater distances without the use of amplifiers (item 114 of FIG. 1). Amplifiers decrease a cable system's channel capacity, degrade the signal quality, and are susceptible to high maintenance costs. Thus, distribution systems that use fiber optics need fewer amplifiers to maintain better signal quality.

Digital data on the upstream and downstream channels is carried over radio frequency (RF) carrier signals. Cable modems are devices that convert digital data to a modulated RF signal and convert the RF signal back to digital form. The conversion is done at two points: at the subscriber's home by a cable modem and by a CMTS located at the head end. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal (it is helpful to keep in mind that the word "modem" is derived from modulator/demodulator). Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been an increased focus on performance, reliability, and improved maintenance of such systems. In sum, cable companies are in the midst of a transition from their traditional core business of entertainment video programming to a position as a full service provider of video, voice and data telecommunication services. Among the elements that have made this transition possible are technologies such as the cable modem.

The Data over Cable Service Interface Specification (DOCSIS) defines a standard for transmitting data over TV/HFC Cable. Specifically, DOCSIS limits the bandwidth for the upstream channel to 10 Mbps. Additionally, conventional cable modems are currently configured to transmit upstream data on a single upstream channel. Data are then typically transmitted using, for example, 16 QAM at 2.56 M baud to achieve an upstream bandwidth of 10 Mbps.

Although a 10 Mbps data transmission bandwidth is adequate for transmitting certain types of data that do not require large amounts of bandwidth (e.g., file transfers), a 10 Mbps bandwidth is inadequate for transmitting data that requires a larger amount of bandwidth (e.g., real time voice and video conferencing). Other examples of applications that require a higher bit rate are web hosting and multicast video.

Therefore, it would be desirable to provide improved mechanisms for cable modem transmission that increase the available upstream bandwidth.

SUMMARY OF THE INVENTION

Accordingly, the present invention provides an apparatus and method for transmitting upstream data over two or more upstream channels. In one embodiment, a cable modem is disclosed. In general terms, a first upstream channel is obtained by the cable modem from the head end. The cable modem is configured to transmit data over the first upstream channel. A second upstream channel is then obtained from the head end. If the second upstream channel differs from the first upstream channel, the cable modem is configured to transmit data over the second upstream channel, as well as the first upstream channel. If the obtained second upstream channel does not vary from the first upstream channel, a next upstream channel is obtained until it varies from the first upstream channel or there are no available upstream channels.

In one implementation, the present invention pertains to a method for transmitting upstream data from a cable modem within a cable television plant. The method includes transmitting a first portion of the upstream data on a first upstream channel from the cable modem and transmitting a second portion of the upstream data on a second upstream channel from the cable modem. The second upstream channel differs from the first upstream channel.

In another implementation, the invention pertains to a cable modem that includes a processor configured to initiate transmission on multiple upstream channels. The cable modem further includes an upstream transmitting component operating in conjunction with the processor and configurable by the processor to transmit data over multiple upstream channels. In one embodiment, the upstream transmitting component includes a first transmitter that is capable of being configured by the processor to transmit data at both a first upstream channel and a second transmitter that is capable of being configured by the processor to transmit at a second upstream channel that differs from the first upstream channel if the second upstream channel is available. In yet another embodiment, the cable modem includes a first media access controller (MAC) coupled with the first transmitter and the processor, and the first MAC is arranged to receive data from the processor for outputting to the first transmitter so that the first transmitter outputs the data over the first upstream channel. The cable modem also includes a second MAC coupled with the second transmitter block and the processor, and the second MAC is arranged to receive data from the processor for outputting to the second transmitter so that the second transmitter outputs the data over the second upstream channel. In another invention implementation, the cable modem also includes a combiner that receives data transmitted over the first and second upstream channels from the first and second transmitter blocks. The combiner multiplexes the first and second upstream channels so that the received data are output on a single line.

In another aspect of the invention, a head end for receiving upstream data from a cable modem is disclosed. The head end includes a splitter that receives an upstream signal from the cable modem. The upstream signal including a first portion of the upstream data on a first upstream channel and a second portion of the upstream data on a second upstream channel that differs from the first upstream channel. The splitter is arranged to separate the first portion of the upstream data transmitted over the first upstream channel from the second portion of the upstream data transmitted over the second upstream channel for further processing of the separated data.

In another method implementation of the invention, a method of transmitting upstream data from a cable modem over multiple upstream channels within a cable television plant is disclosed. The cable modem is configured to transmit over a first upstream channel if the first upstream channel is represented by information within a downstream channel, and the cable modem is also configured to transmit over a second upstream channel if the second upstream channel is represented by information within the downstream channel and if the second upstream channel differs from the first upstream channel.

In one embodiment, it is determined whether the cable modem is authorized to transmit over multiple upstream channels prior to obtaining a second upstream channel, and the cable modem is configured with the second upstream channel only where the cable modem is authorized to transmit over multiple upstream channels. In another embodiment, the method includes transmitting over a single channel if the cable modem is set up only to transmit over the first upstream channel and transmitting over both the first and second upstream channels if the cable modem is set up to transmit over both the first and second upstream channels.

In another cable modem implementation, the cable modem includes a first media access controller coupled with a first memory device into which data is written for transmission upstream from the cable modem and a second media access controller coupled with a second memory device into which data is written for transmission upstream from the cable modem. The cable modem also includes a first transmitter coupled with the first media access controller, a second transmitter coupled with the second media access controller, and a processor configured to configure the first transmitter to transmit data over a first upstream channel. The processor is also configures the second transmitter to transmit data over a second upstream channel that differs from the first upstream channel if the second upstream channel is available, initiates transmission of a first data portion over the first upstream channel by writing to the first memory device of the first media access controller, and initiates transmission of a second data portion over the second upstream channel by writing to the second memory device of the second media access controller.

In another embodiment, the invention pertains to a computer readable medium containing programming instruction for transmitting data from a cable modem within a cable television plant. The computer readable medium includes computer readable code for transmitting a first portion of the upstream data on a first upstream channel from the cable modem and computer readable code for transmitting a second portion of the upstream data on a second upstream channel from the cable modem with the second upstream channel differing from the first upstream channel.

In another embodiment, a computer readable medium containing programming instructions for transmitting upstream data from a cable modem over multiple upstream channels within a cable television plant is contemplated. The computer readable medium includes computer readable code for configuring the cable modem to transmit over a first upstream channel if the first upstream channel is represented by information within a downstream channel and computer readable code for configuring the cable modem to transmit over a second upstream channel if the second upstream channel is represented by information within the downstream channel and if the second upstream channel differs from the first upstream channel.

The present invention has several associated advantages. For example, the present invention provides mechanisms for configuring a cable modem to transmit on two or more channels. This features provides a significant increase in bandwidth over the single upstream channel configuration. Additionally, if one of the multiple upstream channels of a cable modem becomes unable to transmit data, another upstream channel may take over transmission. Thus, the present invention may increase the reliability of data transmission.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides mechanisms within a cable modem for transmitting upstream data on multiple channels. The head end and/or cable plant may be configured in any suitable manner such that an upstream signal, which may include data from multiple upstream channels, may be received by the head end from the same cable modem. For example, the upstream signal from a single modem may exit the modem on one line that is split (e.g., by a splitter) into two lines having two upstream channels. The splitter may be placed within the head end or between the head end and the cable modem. However, placing the splitter within the head end allows the cable plant itself to remain unaltered. This configuration may represent a minimal cost solution for upgrading the cable system to transmit over multiple upstream channels. Alternatively, the cable modem may be configured with two upstream transmission lines that may be each configured with a different upstream channel.

Figure 2:
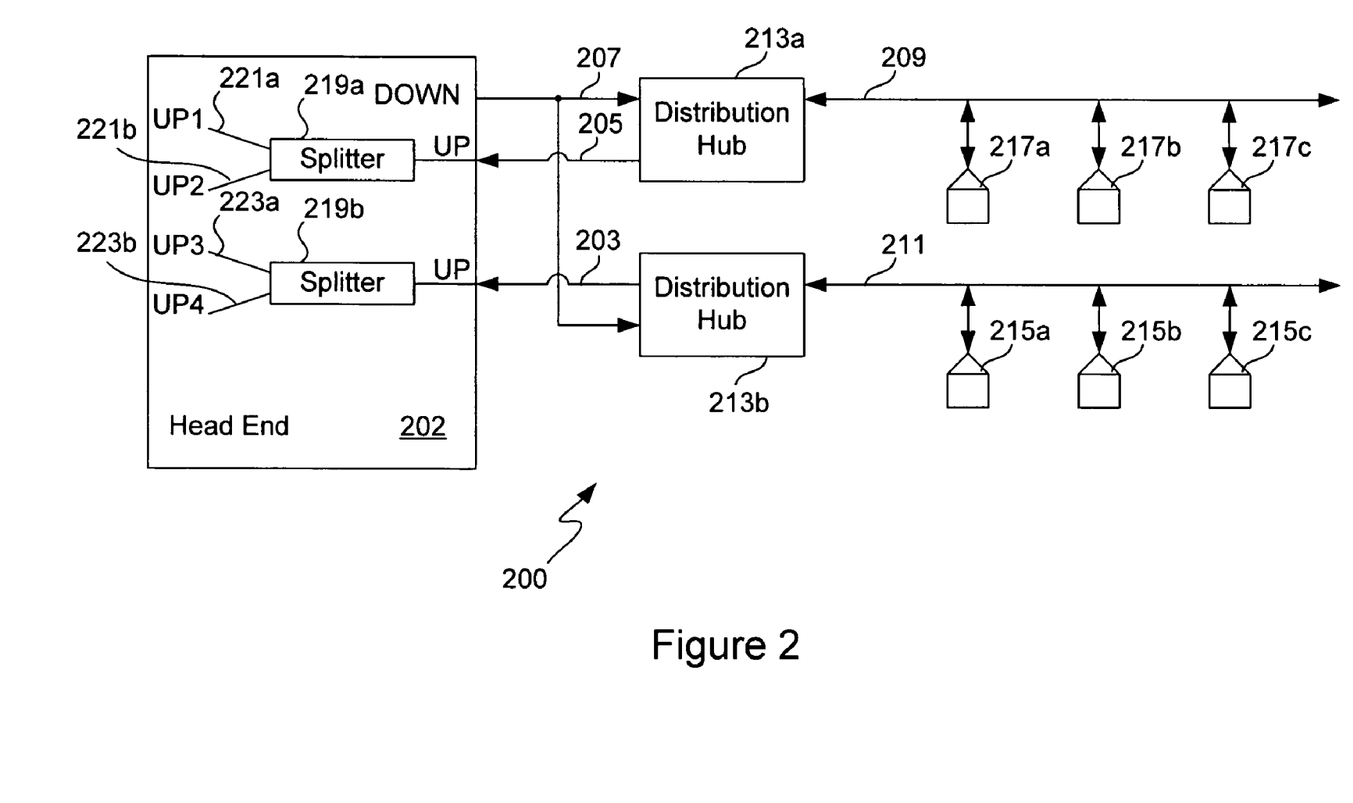
FIG. 2 is a diagrammatic representation of a head end that is configured to receive multi channels from a same subscriber or cable modem in accordance with one embodiment of the present invention.

FIG. 2 is a diagrammatic representation of a head end 202 that is configured to receive multiple channels from a same subscriber or cable modem in accordance with one embodiment of the present invention. As shown, a first plurality of subscribers 217 are coupled with the head end 202 via distribution hub 213a, and a second plurality of subscribers 215 are coupled with the head end 202 via distribution hub 213b.

The head end outputs a downstream signal to both sets of subscribers 215 and 217 through downstream line 207. The downstream signal passes through both distribution hubs 213a and 213b. The distribution hub 213a combines the downstream signal of line 207 with the upstream signal (i.e., of line 205) from subscribers 217 into a multiplexed signal on line 209. Likewise, the distribution hub 213b combines the downstream signal of line 207 with the upstream signal (i.e., of line 203) from subscribers 215 into a multiplexed signal on line 211.

An upstream signal is transmitted by one of the cable modems 217, for example, to line 205 via line 209. This upstream signal may include data transmitted over a first upstream channel and a second upstream channel. Of course, there may be more than two upstream channels. The line 209 is also a multiplexed version of the downstream signal (i.e., of line 207) and the upstream signal (i.e., of line 205). Upstream signal 205 is separated from downstream signal 207 by the distribution hub 213a. Upstream signals 203 and 205 are input into the head end 202.

The head end 202 also includes one or more splitters 219 for receiving the upstream signals of lines 205 and 203 from subscribers 217 and 215, respectively. The splitters 219 separate the upstream signal into two or more upstream channels. As shown, splitter 219a separates upstream signal of line 205 into upstream channels on lines 221a and 221b. Likewise, splitter 219b separates upstream signal of line 203 into upstream channels on lines 223a and 223b.

Figure 3:
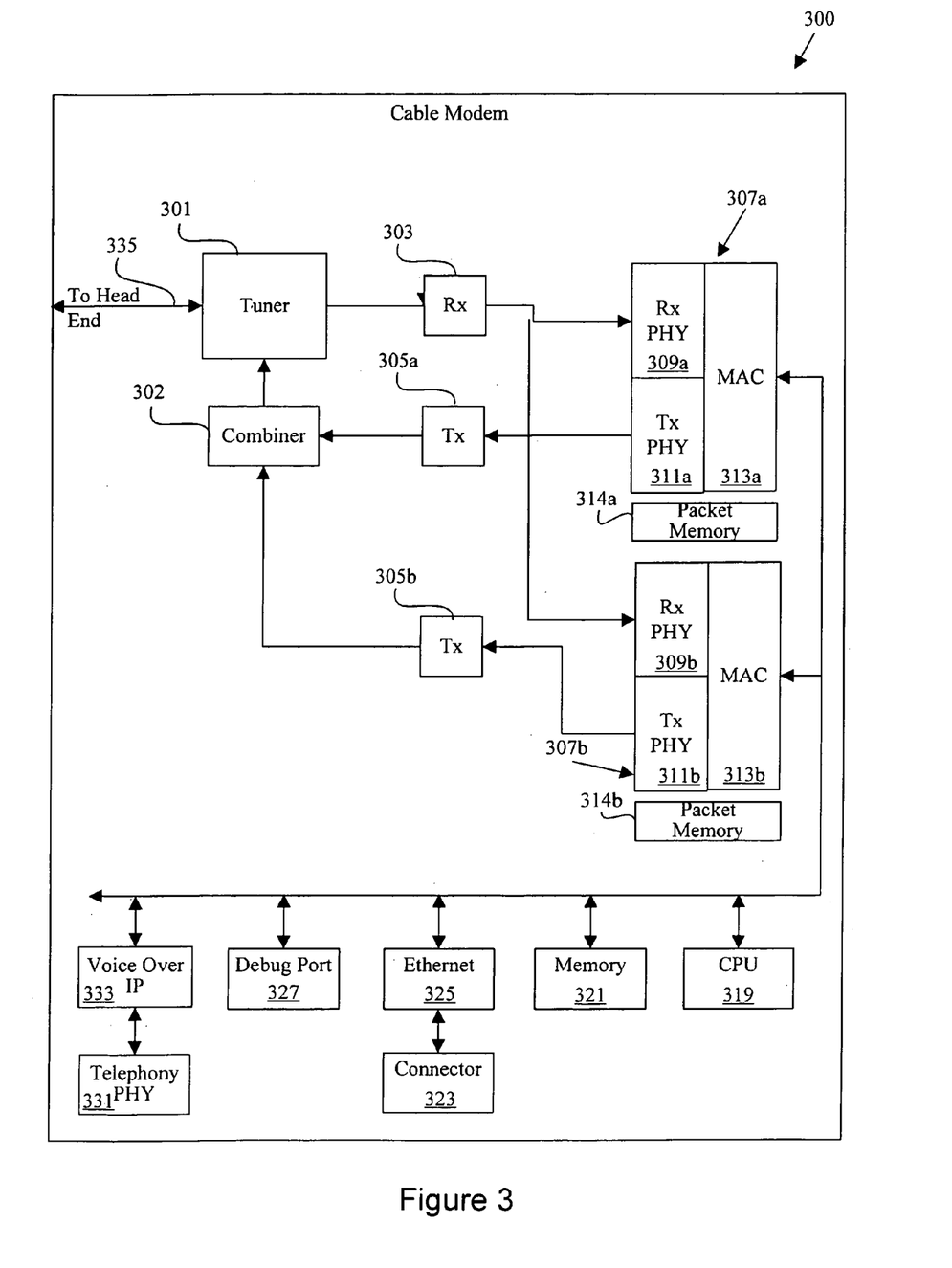
FIG. 3 is a diagrammatic representation of a cable modem that is configured to transmit upstream data over two channels in accordance with one implementation of the present invention.

FIG. 3 is a diagrammatic representation of a cable modem 300 that is configured to transmit upstream data over two channels in accordance with one implementation of the present invention. The cable modem 300 is intended as a logical representation, and is not meant to limit the scope of the invention. Upstream data are output on line 335, and downstream data are also input through the same line 335. As discussed above, the upstream and downstream data are frequency multiplexed on line 335.

On the receive side or downstream side, the cable modem includes a tuner 301, a receiver (Rx) block 303, and an Rx PHY block 309a. The tuner 301 generally receives a multiplexed downstream and upstream signal on line 335 and tunes in to the downstream channel. In other words, the tuner 301 separates out the downstream signal from the upstream signal from signal 335. For example, as required by the DOCSIS protocol, downstream signals are transmitted at frequencies between 88 and 860 MHz within a 6 MHz wide downstream channel. The tuner 301 outputs the tuned downstream signal to Rx block 303.

The Rx block 303 may include a mixer and amplifier. The mixer may be used to change the frequency of the received downstream signal. The Rx block 303 then outputs the downstream signal to two processing blocks 307a and 307b. Specifically, the downstream signal is received by Rx PHY blocks 309a and 309b of processing blocks 307a and 307b, respectively. The Rx PHY blocks 309 converts the RF formatted downstream signal into an appropriately formatted digital signal that is then output to a MAC block 313. Each MAC block generally processes the downstream signal in conjunction with a processor (e.g., as shown, CPU 319).

The processing blocks 307 may have any suitable format for transmitting upstream data and receiving downstream data. For example, each processing block may take the form of an integrated cable MAC/PHY device or separate cable MAC or cable PHY devices or logic. The MAC or PHY devices are logical partitions and are not intended to limit the scope of the invention, e.g., the MAC may be part of a CPU block with a separate PHY. Alternatively, the processing blocks may be combined into a single custom ASIC. In sum, the function blocks described in reference to FIG. 3 may be implemented in any suitable combination of hardware and/or software implementations.

Turning to the upstream side or transmission side of the cable modem, the CPU 319 is configured to transmit upstream data through the first MAC block 313a and/or the second MAC block 313b. In one embodiment, each processing block 307 is coupled with an associated packet memory buffer 314. To initiate transmission, the CPU may write data to the appropriate packet buffer 314 (i.e., 314a and/or 314b). After upstream data are written to the appropriate packet memory buffer 314, the associated MAC (313a and/or 313b) transmits the upstream data through a Tx PHY block (e.g., 311a and/or 311b) to a first Tx block 305a and/or a second Tx block 305b. The Tx PHY blocks convert the digital signals into RF modulated signals.

The Tx blocks may be configured to transmit the upstream signal at a selected upstream channel. For example, the first Tx block 305a may be configured to transmit at a first upstream channel, and the second Tx block 305b may be configured to transmit at a second upstream channel. The Tx blocks 305 then transmit the upstream signals at the two configured upstream channels to a combiner 302. The combiner 302 multiplexes the first upstream signal output by the first Tx block 305a and the second upstream signal output by the second Tx block 305a onto a single line that is output to the tuner 301. The tuner 301 receives the multiple channel upstream signal and multiplexes it with the downstream signal, which combined signal is output on line 335. For example, the tuner transmits the upstream signal within a frequency range between 5 and 42 MHz.

Each processing block 307 is coupled with CPU 319 and memory block 321 as shown. The CPU 319 works in conjunction with the memory block to control upstream data transmission, as well as other data processing functions. One embodiment of upstream data transmission is further described below in reference to FIG. 6. Each processing block 307 may be coupled with any number and kind of interface blocks. As shown, each processing block 307 is coupled to Ethernet block 325, connector block 323, debug port 327, telephony PHY block 331, and voice over IP block 333. The functions of these blocks are well known to people within the cable modem industry.

Although a specific implementation of a multiple upstream channel cable modem has been described with reference to FIG. 3, the cable modem itself may be configured in any suitable arrangement for transmitting upstream data on multiple upstream channels. For example, the mechanisms of the present invention may be implemented with a custom device having a single MAC layer block and multiple physical layer transmission blocks. In this example, the MAC layer blocks is arranged to transmit data over multiple upstream channels through the multiple physical layer transmission blocks. Alternatively, the cable modem may incorporate two MAC blocks coupled to two physical layer transmission blocks (e.g., as described in FIG. 3).

In general terms, the present invention provides mechanisms for configuring a cable modem that is capable of transmitting on multiple channels. The configuration procedure includes obtaining a first available upstream channel from the available downstream channel. That is, the upstream channel is represented by information that is transmitted within the downstream channel. The cable modem is then configured to transmit at the first upstream channel. A second available upstream channel is then obtained (if available), and the cable modem is then also configured to transmit at the second upstream channel. Preferably, the cable modem is configured with two distinct upstream channels (if available). Of course, the cable modem may be configured with more than two distinct upstream channels (if available) if the cable modem is configured for more than two upstream channels.

Figure 4:
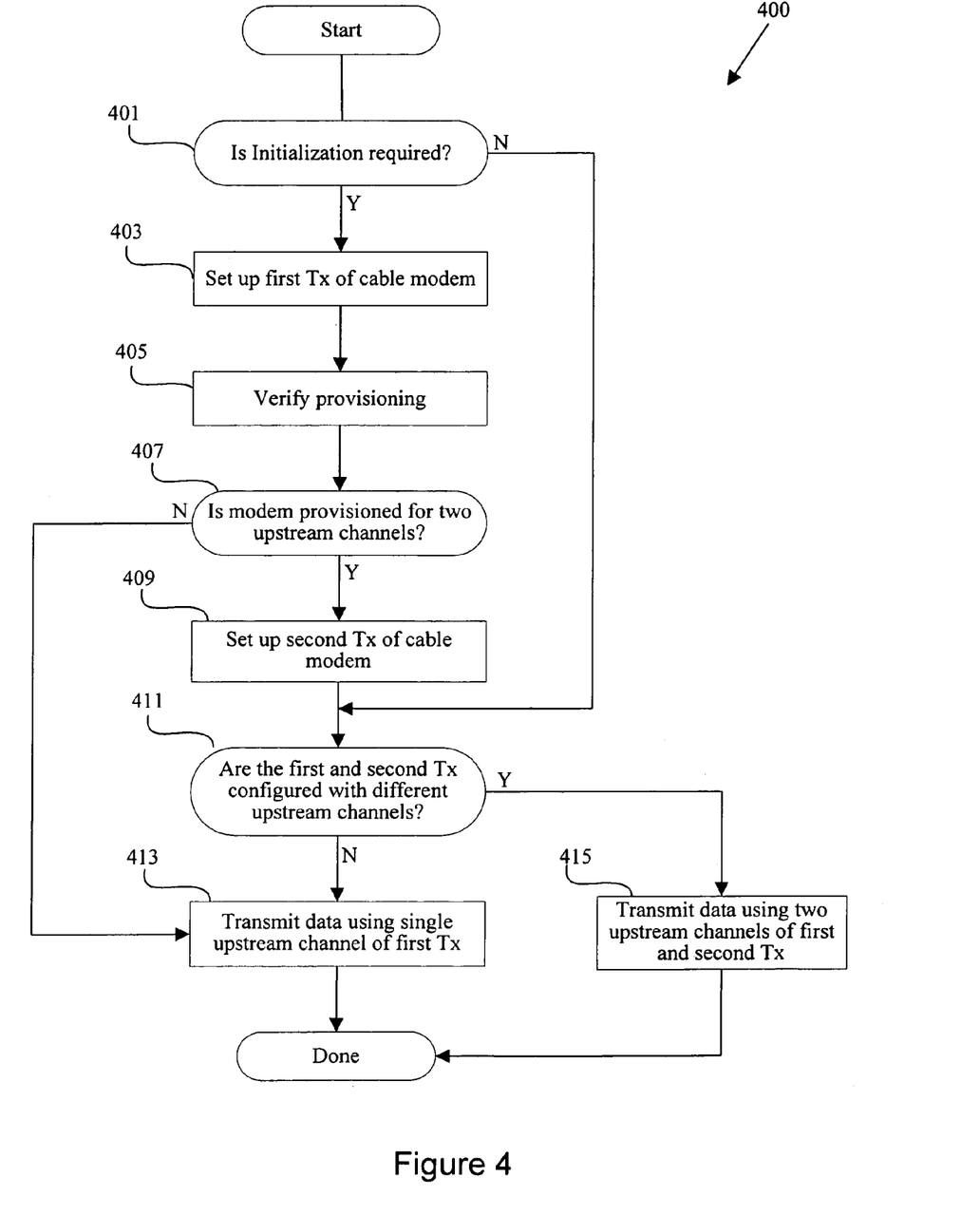
FIG. 4 is flowchart representing a process for configuring a cable modem for transmission on one or more channel(s) and transmitting data on such channel(s) in accordance with one embodiment of the present invention.

FIG. 4 is flowchart representing a process 400 for configuring a cable modem for transmission on one or more channel(s) and transmitting data on such channel(s) in accordance with one embodiment of the present invention. It is first determined whether initialization is required in operation 401. Initialization may include setting up a first Tx block (e.g., 305a of FIG. 3) of the cable modem for data transmission on a first upstream channel and/or setting up a second Tx block (e.g., 305b of FIG. 3) of the cable modem for data transmission on a second upstream channel. Of course, more than two Tx blocks may be present within the cable modem, and these Tx blocks may also be set up.

Initialization may be required for any number of suitable reasons. For example, initialization may occur after powering up of a cable modem. Additionally, initialization may be required if a first Tx block of the cable modem is set up but a second Tx block of the cable modem is not set up. In this case, only the second Tx needs to be set up since the first Tx is already set up. Such a situation would occur, for example, where a second upstream channel was not available for the cable modem during a previous initialization attempt, but a second upstream channel is now available for the cable modem's use.

If it is determined that initialization is required, the first Tx block of the modem is set up in operation 403. Of course, this operation may be skipped if the first Tx is already set up. Setup of the first Tx block generally includes setting the first Tx block to transmit on a first upstream channel. Procedures for configuring a Tx block to transmit at a particular upstream channel are well known to people within the cable modem industry. For example, the DOCSIS specification outlines how to configure a Tx block for transmission. Setup of the first Tx block is further described with reference to FIG. 5A.

Provisioning may then be verified in operation 405. In other words, the cable modem identifies the access rights provided by the head end to the cable modem. It is then determined whether the modem is provisioned for two upstream channels (or more) in operation 407. In other words, it is determined whether the head end has given permission for this particular cable modem to transmit on two upstream channels.

If the modem has been provisioned for two upstream channels, a second Tx of the cable modem is then set up in operation 409. Setting up the second Tx of the cable modem includes attempting to configure the second Tx to transmit on a second upstream channel that differs from the first upstream channel of the first Tx. Setup of the second Tx is further described with reference to FIG. 5B.

After the second Tx of the cable modem is set up or it is determined that initialization is not required, it is then determined whether the first and second Tx are configured with different upstream channels in operation 411. In certain cases, the first and second Tx may be configured with a same upstream channel, or the first Tx is configured to transmit on an upstream channel while the second Tx is not configured. For example, the first and second Tx may be configured with the same upstream channel if only a single upstream channel is available for transmission during the setup operations 403 and 409. Of course, if the second Tx is not set up with a second upstream channel (e.g., only the first Tx is configured with an upstream channel), this operation may be skipped and data may be transmitted using the single upstream channel of the first Tx in operation 413.

If the first and second Tx are configured with different upstream channels, upstream data are then transmitted over the two different channels of the first and second Tx in operation 415. However, if the first and second Tx are configured with the same upstream channel, upstream data are transmitted over a single upstream channel of the first Tx in operation 413. Of course, data may be alternately transmitted on both the first Tx and the second Tx, even though the first Tx and second Tx use the same upstream channel. The process 400 for configuring the cable modem for data transmission on multiple upstream channels and transmitting upstream data then ends. The process 400 may be initiated again when a new cable modem configuration is desired, and/or data are to be transmitted on the cable's configured upstream channel(s). The process 400 may also be performed at regular periodic time intervals, or triggered by any suitable event.

Procedures for setting the cable modem to transmit on multiple channels may include any suitable procedures for setting up a cable modem to transmit on a single channel, which setup procedures are well known by people skilled in the cable modem industry. That is, whatever setup procedure is implemented for setting up a single channel may simply be repeated for setting up a second upstream channel (or any number of upstream channels). Additionally, mechanisms may be included for ensuring that the cable modem is configured with unique upstream channels.

Figure 5A:
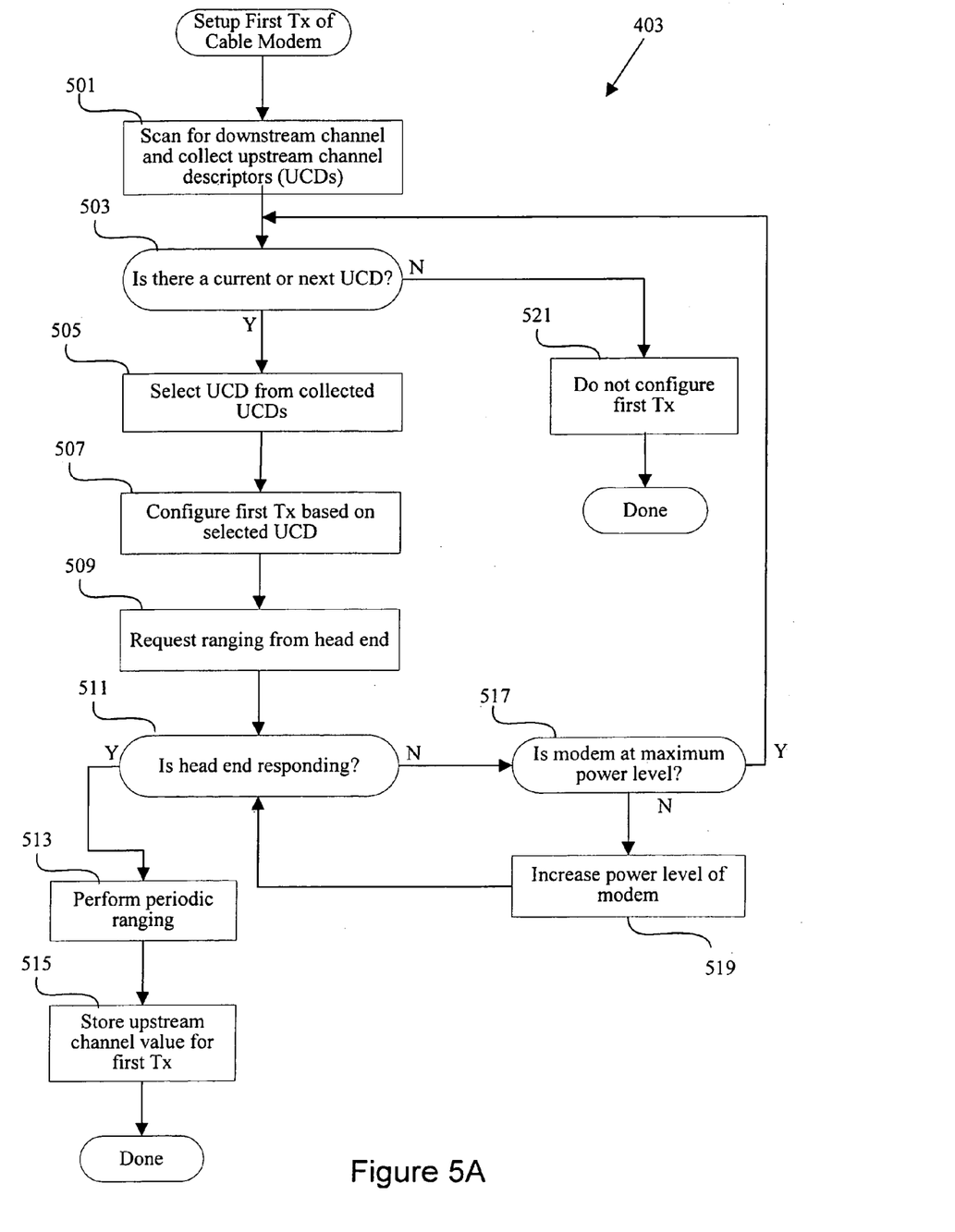
FIG. 5A is a flowchart illustrating the operation of FIG. 4 of setting up the first Tx of the cable modem in accordance with one embodiment of the present invention.

FIG. 5A is a flowchart illustrating the operation 403 of FIG. 4 of setting up the first Tx of the cable modem in accordance with one embodiment of the present invention. Initially, the cable modem scans for the downstream channel and collects upstream channels descriptors (UCD) that are transmitted within the located downstream channel in operation 501. In one embodiment, downstream channels are scanned sequentially to locate a digital signal onto which the cable modem can lock. When the cable modem is able to lock onto a digital signal, the downstream channel has been located. The digital signal may include one or more UCD's that indicate one or more upstream channels that the cable modem may use for upstream data transmission. That is, available UCD's are collected from an available downstream channel.

It is then determined whether there is a current UCD in operation 503. The downstream channel may contain one or more UCD's or not contain any UCDs. If there is a current UCD within the collected UCDs, a UCD is then selected from the collected UCDs in operation 505. The selected UCD may also be verified to determine whether it is still valid and/or available. For example, the downstream channel may be scanned again to verify whether the selected UCD is still available and/or whether the selected UCD's configuration has changed since the UCD's were last collected in operation 501.

Any suitable algorithm may be implemented to select a UCD. For example, the first UCD within the collected UCDs may be selected first, the second UCD may be selected second, etc. In one embodiment, a UCD is selected at random so as to reduce the likelihood that the cable modem is competing with a significant number of other cable modems for the same UCD. That is, if every cable modem attempts to initially select the first UCD, these modems are competing for the same UCD and it is likely that most of the modems (except one) will have to select a next UCD. Likewise, if the rest of the modems attempt to then select the second UCD within the collected UCD's, the remaining modems will again compete for the same UCD. Thus, this selection method may consume a significant amount of processing time.

The first Tx is then configured based on the selected UCD in operation 507. After the first Tx is configured, normal ranging processes are performed. In the illustrated embodiment, ranging is then requested from the head end using the first upstream channel in operation 509. It is then determined whether the head end is responding in operation 511. If the head end is responding, periodic ranging is then performed in operation 513. Periodic ranging or station maintenance is performed using the first upstream channel to reevaluate the cable modem's configuration to determine whether it is within acceptable levels. The first upstream channel frequency, as well as other configuration parameters, may be altered during periodic ranging. Although not shown, periodic ranging is typically performed at regular time intervals after the cable modem is initially ranged (e.g., as in the initial ranging operations 509 and 511).

After periodic ranging, the upstream channel value of the first Tx is then stored in operation 515. The upstream channel value may be the upstream channel value that was obtained within the selected UCD that was used initially to configure the first Tx in operation 507, or the upstream channel value may be a value that resulted from the periodic ranging of operation 513. Other suitable values may also be stored, such as an assigned upstream time slot value and assigned power level value for the cable modem, which values are also available within the downstream channel. The operation 403 for setting up of the first Tx then ends.

If it is determined that the head end is not responding via operation 511, it is then determined whether the modem is set at a maximum power level in operation 517. If the level is not set at the maximum power level, the power level of the modem is increased in operation 519. The power level is increased until the head end responds or the maximum power level is reached. If the maximum power level is reached, it is determined that the head end is not responding to the configured first upstream channel value.

It is then determined whether there is a next UCD in operation 503. If there is a next UCD, another UCD is then selected from the collected UCD in operation 505. Next UCD's are selected until there are no more UCD's within the collected UCD's or the head end responds to the ranging request. If the next selected UCD results in a response from the head end, the set up operation 403 ends with the first Tx being configured based on the last selected UCD. If there are no more UCDs and the head end has failed to respond, the first Tx is not configured in operation 521, and the set up operation 403 ends.

Figure 5B:
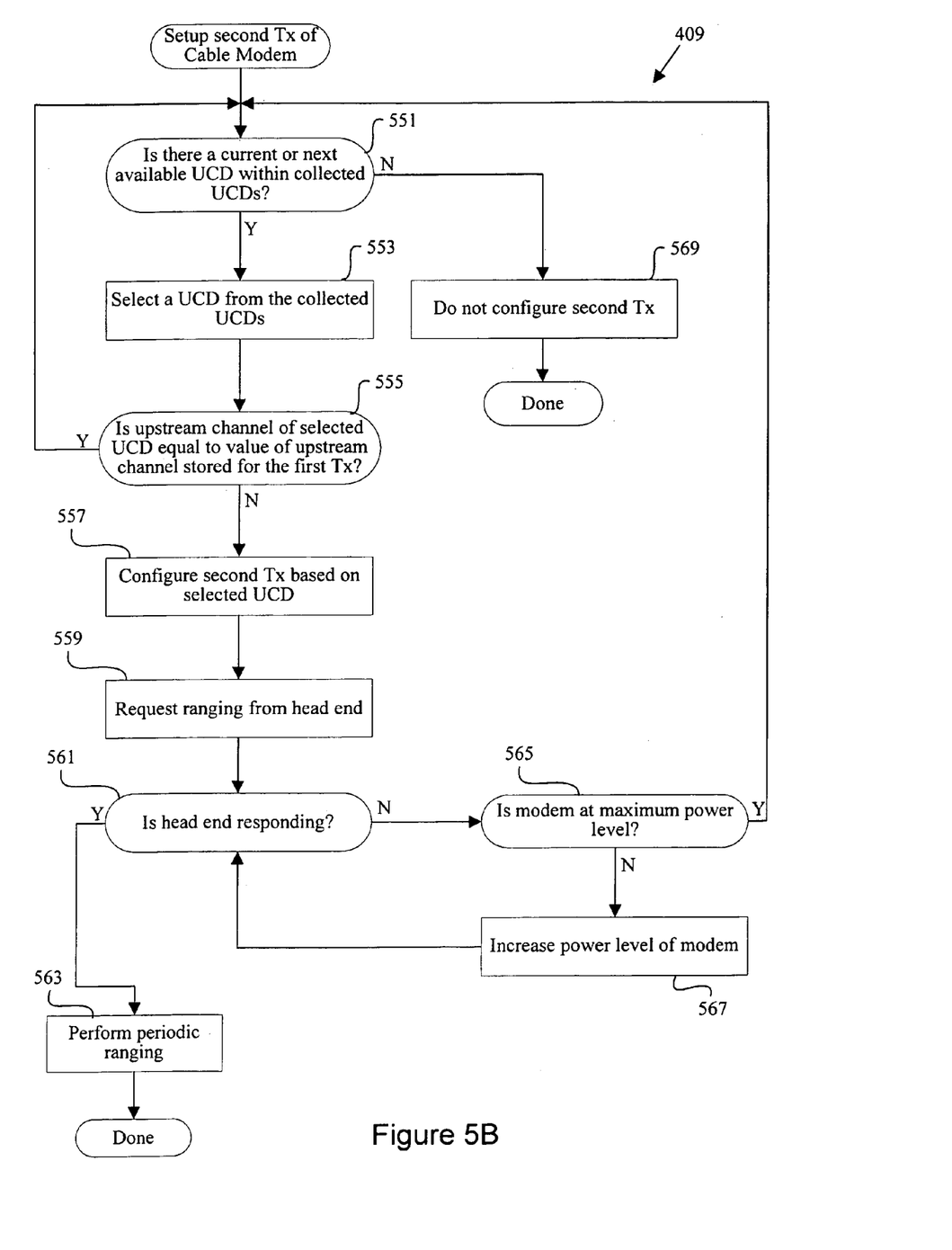
FIG. 5B is a flowchart illustrating the operation of FIG. 4 of setting up the second Tx of the cable modem in accordance with one embodiment of the present invention.

FIG. 5B is a flowchart illustrating the operation 409 of FIG. 4 of setting up the second Tx of the cable modem in accordance with one embodiment of the present invention. Initially, it is determined whether there is a current available UCD within the collected UCD in operation 551. The UCD's were already collected within the operation 403 of FIG. 5A for setting up the first Tx. Of course, the downstream channel may be scanned again and a new set of UCD's may be recollected since there may now be more available UCD's with the downstream channel.

If there is an available UCD, a UCD is selected from the collected UCD in operation 553. The selected UCD may also be verified to determine whether it is still valid and/or available. In operation 555, it is then determined whether the upstream channel of the selected UCD is equal to the value of the upstream channel stored for the first Tx. If the channel is the same, it is then determined whether there is a next available UCD in operation 551. If the channel is not the same, the second Tx is then configured based on the selected UCD in operation 557. Ranging is then requested by the cable modem using the second upstream channel in operation 559. It is then determined whether the head end is responding in operation 561.

If the head end is not responding, it is then determined whether the modem is set at a maximum power level in operation 565. If the modem is not set at the maximum power level, the power level of the modem is then increased in operation 567. The power level of the modem continues to be increased until the head end responds or the modem is set to the maximum power level. If the head end responds, periodic ranging is then performed in operation 563 and the operation 409 for setting up the second Tx ends.

However, if the modem is set at the maximum power level, it is then determined whether there is a next available UCD within the selected UCD's in operation 551. If there is a next available UCD, a UCD is selected from the collected UCD in operation 553. However, if there is not next available UCD, the second Tx is not configured in operation 569, and the operation for setting up second Tx then ends. UCD's continue to be selected until the second Tx is configured with a different upstream channel than the first Tx or there are no more available UCD's. Of course, the second Tx may be configured with the same channel as the first Tx.

Figure 6:
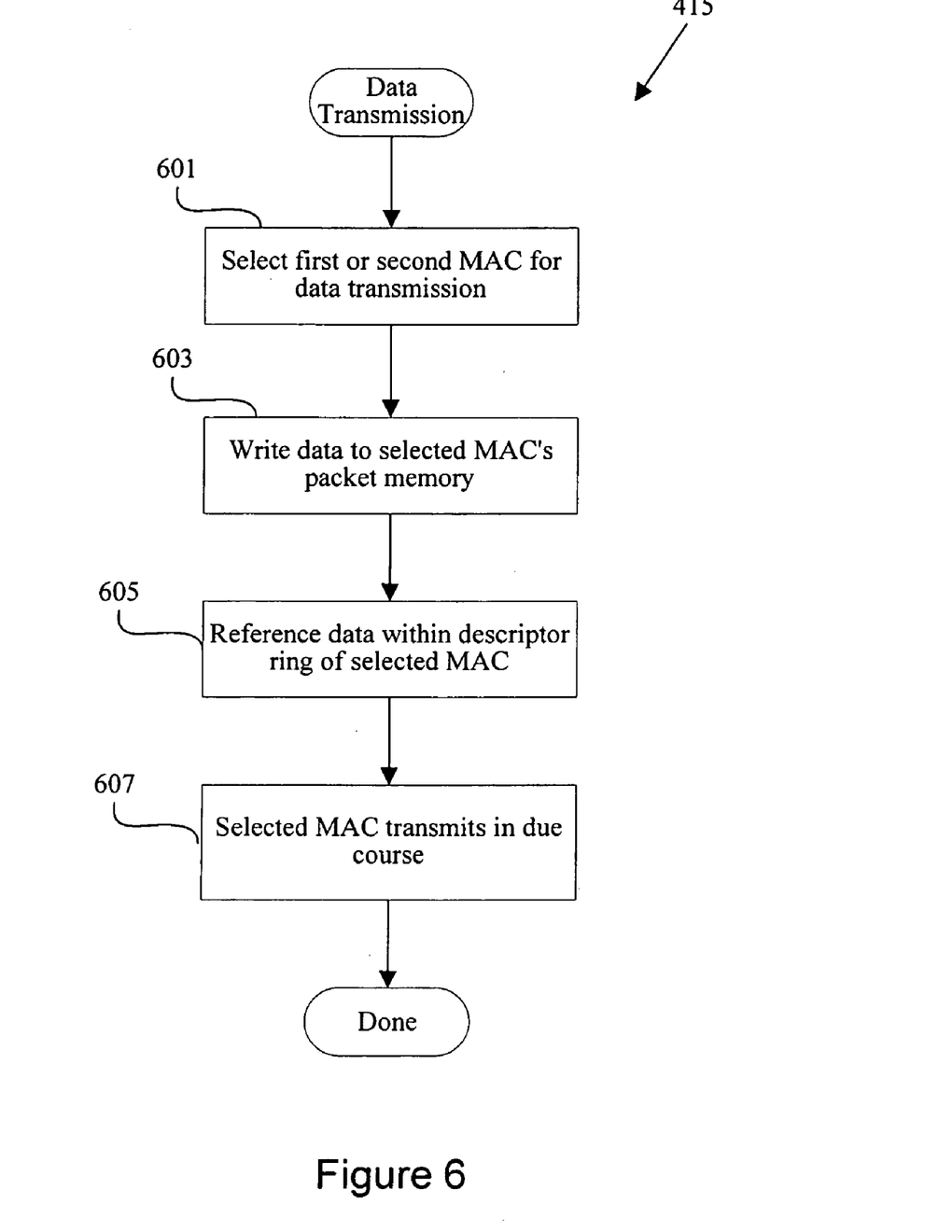
FIG. 6 is a flowchart illustrating the operation of FIG. 4 for transmitting data on the upstream channel(s) of the first and second Tx in accordance with one embodiment of the present invention.

FIG. 6 is a flowchart illustrating the operation 415 of FIG. 4 for transmitting data on the upstream channel(s) of the first and second Tx in accordance with one embodiment of the present invention. Initially, the first or second MAC (e.g., MAC 313a or 313b of FIG. 3) is selected for data transmission in operation 601. Selection may be based on any suitable factor. For example, data may be evenly divided between the first and second MAC. By way of specific example, the first MAC is selected for transmitting a first packet, the second MAC is then selected for transmitting a second packet, the first MAC is then again selected for transmitting a third packet, etc.

By way of another example, MAC selection may depend on the traffic levels of the separate upstream channels. That is, if the first channel of the first MAC is congested, the second MAC is selected for data transmission. Alternatively, the first MAC may be selected as the primary data transmission channel, while the second MAC is selected for load balancing. Load balancing may be accomplished by considering any suitable set of factors that affect load on a particular upstream. For example, a first consideration may be the characteristic of the upstream channel as defined by parameters of the UCD. The parameters defined by the UCD may determine how much bandwidth is available for data transmission on the upstream channel. These parameters may include QAM mode, channel width, minislot size if SLC is being used, and/or preamble length, among other factors. These parameters may then be used to determine the capacity of the upstream. A second factor to consider for load balancing is the actual traffic that is being sent on a given upstream (e.g., calculate the actual bits being transmitted per second). For example, the number of packets being transmitted and the size of these packets are used to calculate the actual bits per second. Load balancing may include consideration of these factors before queuing each packet to keep the bits per second being transmitted on a specific upstream within the correct bandwidth ration (bps capacity) for that upstream.

By way of another example, transmission may be based on data type. For instance, high priority data (e.g., voice over traffic) may be transmitted on the first channel of the first MAC, while other non-high priority data (e.g., all other traffic) are transmitted on the second channel of the second MAC. In another implementation, a first type of security data may be transmitted on the first channel, while a second type of security data may be transmitted on the second channel. Data type may be determined in any suitable manner. For example, particular data fields of a packet may be read to determine a packet type. Alternatively, packets may be categorized into different types according to packet size.

After either the first or second MAC is selected for data transmission, the data are written to the selected MAC's associated packet memory (e.g., packet memory 314a or 314b of FIG. 3) in operation 603. The written data are then referenced within a descriptor ring of the selected MAC in operation 605. The selected MAC then transmits in due course in operation 607. For example, the data are transmitted in first-in first-out order. The data transmission operation 415 then ends.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, although the present invention was described as being implemented within a wired cable system, of course, the cable system may be in the form of a wireless cable system. By way of another example, the cable modem may utilize two different MAC addresses so that the head end may distinguish between the two upstream channels from the same cable modem. Alternatively, the CMTS and modem may implement a protocol that allows for multiple upstream channels to be used by a single MAC address of a single modem.

Accordingly, the present embodiments are to be considered as illustrative and not restrictive, and the invention is not to be limited to the details given herein, but may be modified within the scope and equivalents of the appended claims.

What is claimed is:

1. A method for transmitting upstream data from a cable modem within a cable plant, the method comprising:
   selecting a first upstream channel for transmission of a first portion of the upstream data and selecting a second upstream channel for transmission of a second portion of the upstream data, wherein the selection of the first and second upstream channels is based on a criteria selected from a group consisting of a load balancing criteria and a data type criteria;
   transmitting the first portion of the upstream data on the first upstream channel from a first PHY block of the cable modem; and
   transmitting the second portion of the upstream data on the second upstream channel from a second PHY block of the cable modem, the second upstream channel differing from the first upstream channel in their respective frequency ranges, wherein the first PHY block differs from the second PHY block.

2. A method as recited in claim 1, further comprising:
   obtaining the first upstream channel from information in the downstream channel input to the cable modem; and
   obtaining the second upstream cannel from the information in the downstream channel input to the cable modem.

3. A method as recited in claim 2, wherein the information comprises one or more upstream channel descriptors (UCDs) and obtaining the first upstream channel comprises collecting the one or more UCDs from the downstream channel, and selecting a first one of the collected UCD(s), wherein the first upstream channel is based on the first selected UCD.

4. A methods as recited in claim 3, wherein the second upstream channel is obtained by selecting a second one of the collected UCD(s), wherein the second upstream channel is based on the second selected UCD.

5. A method as recited in claim 4, wherein selecting the first and second UCD's is based on a random algorithm.

6. A method as recited in claim 4, further comprising verifying whether the second upstream channel is still valid.

7. A method as recited in claim 1, wherein transmitting data over the first upstream channel is alternated with transmitting data over the second upstream channel.

8. A method as recited in claim 1, wherein a first type of data are transmitted over the first ups channel, and a second type of data are transmitted over the second upstream channel.

9. A method as recited in claim 1, wherein data are transmitted over the first upstream channel when it is less congested than the second upstream channel, and data are transmitted over the second upstream channel when it is less congested than the first upstream channel.

10. A method as recited in claim 1, wherein data are primarily transmitted over the first upstream channel, and data are transmitted over the second upstream channel to facilitate load balancing.

11. A cable modem comprising:
   a processor configured to initiate selective transmission on multiple upstream channels, wherein the selective transmission on multiple upstream channels is based on a criteria selected from a group consisting of a load balancing criteria and a data type criteria; and
   an upstream transmitting component operating in conjunction with the processor and configurable by the processor to transmit data over multiple upstream channels through different PHY blocks, wherein the multiple upstream channels are assigned within a downstream channel received into the cable modem and wherein the first upstream channel has a different frequency range than the second upstream channel.

12. A cable modem as recited in claim 11, wherein the upstream transmitting component includes a first transmitter that is capable of being configured by the processor to transmit data at a first upstream channel and a second transmitter that is capable of being configured by the processor to transmit at a second upstream channel that differs from the first upstream channel if the second upstream channel is available.

13. A cable modem as recited in claim 12, further comprising;
   a first media access controller (MAC) coupled with the first transmitter and the processor, the first MAC arranged to receive data from the processor for outputting to the first transmitter so that the first transmitter outputs the data over the first upstream channel; and
   a second MAC coupled with the second transmitter and the processor, the second MAC arranged to receive data from the processor for outputting to the second transmitter so that the second transmitter outputs the data over the second upstream channel.

14. A cable modem as recited in claim 12, filter comprising a combiner receiving data transmitted over the first and second upstream channels from the first and second transmitter, the combiner multiplexing the first and second upstream channels so that the received data are output on a single line.

15. A cable modem as recited in claim 13, wherein the first MAC is integrated within a first integrated MAC and PHY device, and the second MAC is integrated within a second integrated MAC and PHY device.

16. A cable modem as recited in claim 13, wherein the first MAC is coupled with a first packet memory, and the second MAC is coupled with a second packet memory, the first and second MAC being arranged to transmit data that is written to its corresponding packet memory.

17. A cable modem as recited in claim 16, wherein the first and second packet memory are located within a DRAM device.

18. A cable modem as recited in claim 12, further comprising:
   a MAC coupled with the first transmitter block, the second transmitter, and the processor, the MAC being arranged to receive data from the processor for outputting to the first transmitter and/or the second transmitter so that the first transmitter and/or second transmitter outputs the data over the first upstream channel and/or second upstream channel.

19. A head end for receiving upstream data from a cable modem, comprising a splitter that receives an upstream signal from the cable modem, the upstream signal including a first portion of the upstream data on a first upstream channel and a second portion of the upstream data on a second upstream channel that differs from the first upstream channel and wherein the first upstream channel has a different frequency range than the second upstream channel, the splitter being arranged to separate the first portion of the upstream data transmitted over the first upstream channel from the second portion of the upstream data transmitted over the second upstream channel for further processing of the separated data, wherein the head end is further operable to assign the first upstream channel and the second upstream channel to the cable modem, wherein the first and second upstream channels have been selected for transmission of their respective data from different PHY blocks based on a load balancing criteria or a data type criteria.

20. A method of transmitting upstream data from a cable modem over multiple upstream channels within a cable plant, the method comprising:
   receiving a downstream signal within a downstream channel into the cable modem;
   configuring the cable modem to transmit over a first upstream channel specified in the downstream signal;
   configuring the cable modem to transmit over a second upstream channel which has a different frequency range than the second upstream channel if the second channel is specified in the downstream signal; and
   selectively transmitting different data portions over the first and second channels through two different PHY blocks based on a criteria selected from a group consisting of a load balancing criteria and a data type criteria.

21. A method as recited in claim 20, further comprising:
   determining whether the cable modem is authorized to transmit over multiple upstream channels prior to configuring the cable modem to transmit over the second upstream channel; and
   confirming the cable modem with the second upstream channel only when the cable modem is authorized to transmit over multiple upstream channels.

22. A method as recited in claim 21, further comprising:
   transmitting over a single channel if the cable modem is set up only to transmit over the first upstream channel; and transmitting over both the first and second upstream channels if the cable modem is set up to transmit over both the first and second upstream channels.

23. A method as recited in claim 22, wherein transmitting over both the first and second upstream channels includes alternatively selecting the first and second upstream channels for transmission of one or more packets of data.

24. A method as recited in claim 22, wherein transmitting over both the first and second upstream channels includes selecting either the first or second upstream channels for transmission of a particular type of data.

25. A method as recited in claim 22, wherein transmitting over both the first and second ups channels includes selecting either the first or second upstream channels for transmission of data based on which upstream channel is least congested.

26. A method as recited in claim 22, wherein transmitting over both the first and second upstream channels includes selecting the first upstream channel for primary data transmission and selecting the second upstream channel for load balancing.

27. A method as recited in claim 20, further comprising powering up the cable modem, wherein the setting up of the cable modem with the first upstream channel is initiated by the powering up.

28. A method as recited in claim 20, wherein the setting up the cable modem with the second upstream channel is initiated when the cable modem has previously been set up for transmitting over only a single upstream channel.

29. A method as recited in claim 20, wherein the setting up of the cable modem with the second upstream channel is initiated when the cable modem has previously been set up for transmitting over only a single upstream channel.

30. A method as recited in claim 20, further comprising:
prior to setting up the cable modem to transmit over the second upstream channel requesting initial ranging using the first upstream channel;
if a transmission power level of the cable modem is not greater than a maximum transmission power level, adjusting the transmission power level of the cable modem when the head end fails to respond to the initial ranging request using the first upstream channel; and
if the transmission power level is greater than the maximum transmission power level, setting up the cable modem with a next first upstream channel; and
performing periodic ranging between the head end and the cable modem using the first upstream channel when the head end responds to the initial ranging request using the first upstream channel.

31. A method as recited in claim 30, wherein the transmission power level is adjusted in increments from a minimum value to a maximum power level.

32. A method as recited in claim 30, wherein a value of the first upstream channel is altered by the periodic ranging and the cable modem is set up to transmit over the second upstream channel that differs from the altered first upstream channel value.

33. A method as recited in claim 30, further comprising:
after setting up the cable modem to transmit over the second upstream channel, requesting initial ranging using the second upstream channel;
if a transmission power level of the cable modem is not greater than the maximum transmission power level, adjust the transmission power level of the cable modem when the head end fails to respond to the initial ranging request using the second upstream channel;
if the transmission power level is greater than the maximum transmission power level, setting up the cable modem with a next second upstream channel if available; and
performing periodic ranging between me head end and the cable modem using the second upstream channel when the head end responds to the initial ranging request using the second upstream channel.

34. A method as recited in claim 33, wherein a value of the first upstream channel is altered by the periodic ranging and the cable modem is set up to transmit over the second upstream channel that differs from the altered first upstream channel value.

35. A cable modem comprising:
a first media access controller associated with a first memory portion into which data is written for mission upstream from the cable modem;
a second media access controller associated with a second memory portion into which data is written for transmission upstream from the cable modem;
a first PHY block coupled with the first media access controller, a second PHY block coupled with the second media access controller; and
a processor configured to receive a downstream signal within a downstream channel into the cable modem, configure the first PHY block to transmit data over a first upstream channel obtained from the downstream signal, configure the second PHY block to transmit data over a second upstream channel having a different frequency than the first upstream channel and obtained from the downstream signal if the second upstream channel is available, select the first upstream channel for transmission of a first data portion by writing to the first memory portion of the first media access controller so that the first data portion is transmitted through the first PHY block and select the second upstream channel for transmission of a second data portion by writing to the second memory portion of the second media access controller so that the second data portion is transmitted through the second PHY block, wherein selection of the first and second channels is based on a criteria selected from a group consisting of a load balancing criteria and a data type criteria.

36. A computer readable medium containing programming instruction for transmitting data from a cable modem within a cable plant, the computer readable medium comprising;
computer readable code for selecting a first upstream channel for transmission of a first portion of the upstream data and selecting a second upstream channel for transmission of a second portion of the upstream data, wherein the selection of the first and second upstream channels is based on a criteria selected from a group consisting of a load balancing criteria and a data type criteria;
computer readable code for transmitting the first portion of the upstream data on the first upstream channel from a first PHY block of the cable modem; and
computer readable code for transmitting the second portion of the upstream data on the second upstream channel from the cable modem, the second upstream channel differing from a second PHY block of the first upstream channel in their respective frequency ranges, wherein the first PHY block differs from the second PHY block.

37. A computer readable medium containing programming instructions for transmitting upstream data from a cable modem over multiple upstream channels within a cable plant, the computer readable medium comprising;

computer ale code for receiving a downs signal within a downstream channel into the cable modem, wherein the downstream signal specifies an assignment of a first upstream channel and a second upstream channel;

computer readable code for configuring the cable modem to transmit over a first upstream channel if the first upstream channel is represented by information within a downstream channel;

computer readable code for configuring the cable modem to transmit over a second upstream channel if the second upstream channel is represented by information within the downstream channel and if the second upstream channel differs from the first upstream channel and wherein the first upstream channel has a different frequency range than the second upstream channel; and computer readable code for selectively transmitting different data portions over the first and second channels through two different PHY blocks based on a criteria selected from a group consisting of a load balancing criteria and a data type criteria.

38. A computer readable medium as recited in claim 36, further comprising:

computer readable code for obtaining the first upstream channel from information in the downstream channel input to the cable modem; and computer readable code for obtaining the second upstream channel from the information in the downstream channel input to the cable modem.

39. A computer readable medium as recited in claim 38, wherein the information comprises one or more upstream channel descriptors (UCDs) and obtaining the first upstream channel comprises collecting the one or more UCDs from the downstream channel, and selecting a first one of the collected UCD(s), wherein the first upstream channel is based on the first selected UCD.

40. A computer readable medium as recited in claim 39, wherein the second upstream channel is obtained by selecting a second one of the collected UCD(s), wherein the second upstream channel is based on the second selected UCD.

41. A computer readable medium as recited in claim 40, wherein selecting the first and second UCD's is based on a random algorithm.

42. A computer readable medium as recited in claim 40, further comprising verifying whether the second upstream channel is still valid.

43. A computer readable medium as recited in claim 39, wherein transmitting over the first upstream channel is alternated with transmitting data over the second upstream channel.

44. A computer readable medium as recited in claim 39, wherein a first type of data are transmitted over the first upstream channel, and a second type of data are transmitted over the second upstream channel.

45. A computer readable medium as recited in claim 39, wherein data are transmitted over the first upstream channel when it is less congested than the second upstream channel, and data are transmitted over the second upstream channel when it is less congested than the first upstream channel.

46. A computer readable medium as recited in claim 39, wherein data are primarily transmitted over the first upstream channel, and data are transmitted over the second upstream channel to facilitate load balancing.

47. A computer readable medium as recited in claim 37, further comprising:

computer code for determining whether the cable modem is authorized to transmit over multiple upstream channels prior to configuring the cable modem to transmit over the second upstream cannel; and computer code for configuring the cable modem with the second upstream channel only when the cable modem is authorized to transmit over multiple upstream channels.

48. A computer readable medium as recited in claim 47, further comprising:

computer code for transmitting over a single channel if the cable modem is set up only to transmit over the first upstream channel; and computer code for transmitting over both the first and second upstream channels if the cable modem is set up to transmit over both the first and second upstream channels.

49. A computer readable medium as recited in claim 48, wherein transmitting over both the first and second upstream channels includes alternatively selecting the first and second upstream channels for transmission of one or more packets of data.

50. A computer readable medium as recited in claim 48, wherein transmitting over both the first and second upstream channels includes selecting either the first or second upstream a channels for transmission of a particular type of data.

51. A computer readable medium as recited in claim 48, wherein transmitting over both the first and second upstream channels includes selecting either the first or second upstream channels for transmission of data based on which upstream channel is least congested.

52. A computer readable medium as recited in claim 48, wherein transmitting over both the first and second upstream channels includes selecting the first upstream channel for primary data transmission and selecting the second upstream channel for load balancing.

53. A computer readable medium as recited in claim 37, further comprising computer code for powering up the cable modem, wherein the setting up of the cable modem with the first upstream channel is initiated by the powering up.

54. A computer readable medium as recited in claim 37, wherein the setting up the cable modem with the second upstream channel is initiated when the cable modem has previously been set up for transmitting over only a single upstream channel.

55. A computer readable medium as recited in claim 37, wherein the setting up of the cable modem with the second upstream channel is initiated when the cable modem has previously been set up for transmitting over only a single upstream channel.

56. A computer readable medium as recited in claim 37, further comprising computer code for, prior to setting up the cable modem to transmit over the second upstream channel, requesting initial ranging using the first upstream channel;

computer code for adjusting the transmission power level of the cable modem when the head end fails to respond to the initial ranging request using the first upstream cannel if a transmission power level of the cable modem is not greater than a maximum transmission power level; and computer code for setting up the cable modem with a next first upstream channel if the transmission power level is greater than the maximum transmission power level; and computer code for performing periodic ranging between the head end and the cable modem using the first upstream channel when the head end responds to the initial ranging requesting the first upstream channel.

57. A computer readable medium as recited in claim 56, wherein the transmission power level is adjusted in increments from a minimum value to a maximum power level.

58. A computer readable medium as recited in claim 56, wherein a value of the first upstream channel is altered by the periodic ranging and the cable modem is set up to transmit over the second upstream channel that differs from the altered first upstream channel value.

59. A computer readable medium as recited in claim 56, further comprising:

computer code for requesting initial ranging using the second upstream channel after setting up the cable modem to transmit over the second upstream channel;

computer code for adjusting the transmission power level of the cable modem when the head end fails to respond to the initial ranging requesting the second upstream channel if a transmission power level of the cable modem is not greater than the maximum transmission power level;

computer code for setting up the cable modem with a next second upstream channel if available if the transmission power level is greater than the maximum transmission power level; and computer code for performing periodic ranging between the head end and the cable modem using the second upstream channel when the head end responds to the initial ranging request using the second upstream channel.

60. A computer readable medium as recited in claim 59, wherein a value of the first upstream channel is altered by the periodic ranging and the cable modem is set up to transit over the second upstream channel that differs from the altered first upstream channel value.

61. An apparatus for transmitting upstream data from a cable modem within a cable plant, the apparatus comprising:

means for selecting a first upstream channel for transmission of a first portion of the upstream data and selecting a second upstream channel for transmission of a second portion of the upstream data, wherein the selection of the first and second upstream channels is based on a criteria selected from a group consisting of a load balancing criteria and a data type criteria;

means for transmitting the first portion of the upstream data on the first upstream channel from a first PHY block of the cable modem; and means for transmitting the second portion of the upstream data on the second upstream channel from a second PHY block of the cable modem, the second upstream channel differing from the first upstream channel in their respective frequency ranges, wherein the first PHY block differs from the second PHY block.

62. An apparatus for receiving upstream data from a cable modem, comprising:

means for receiving an upstream signal from the cable modem, the upstream signal including a first portion of the upstream data on a first upstream channel and a second portion of the upstream data on a second upstream channel that differs from the first upstream channel and wherein the first upstream channel has a different frequency range than the second upstream channel, wherein the first portion of the upstream data transmitted over the first upstream channel is separated from the second portion of the upstream data transmitted over the second upstream channel for further processing of the separated data; and means for assigning the first upstream channel and the second upstream channel to the cable modem, where the first and second upstream channels have been selected for transmission of their respective data from different PHY blocks based on load balancing or data type criteria.

* * * * *